April 26, 1927.
L. Y. KIMURA
PIVOTED TYPE COMPASS
Original Filed June 18, 1924
1,626,540
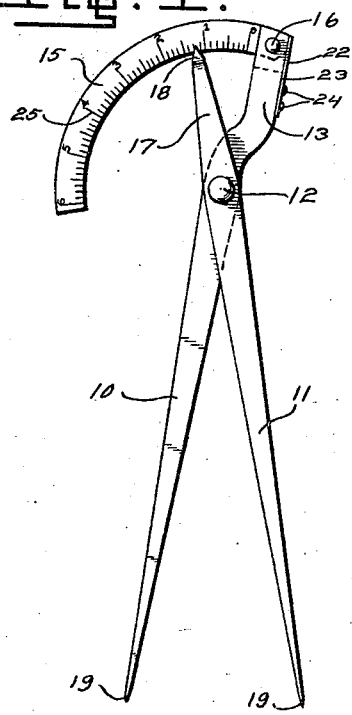
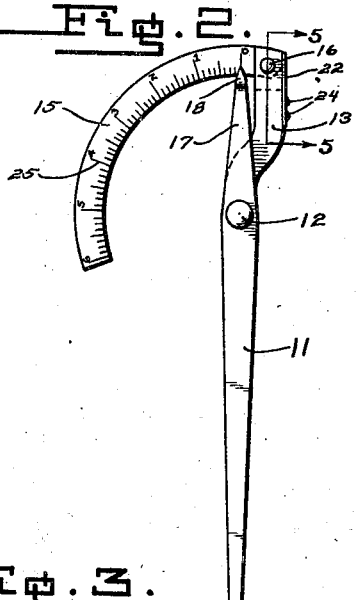
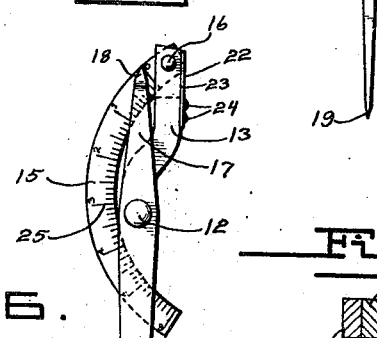
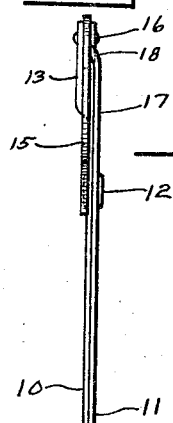
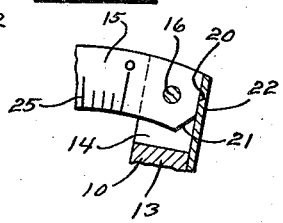
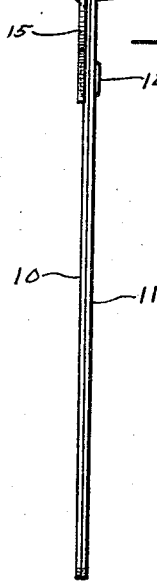
Inventor
Lawrence Y. Kimura Patented Apr. 26, 1927.

1,626,540

UNITED STATES PATENT OFFICE.

LAWRENCE YASUKICHI KIMURA, OF RICHMOND, CALIFORNIA.

PIVOTED-TYPE COMPASS.

Application filed June 18, 1924, Serial No. 720,863. Renewed September 29, 1926.

The present invention relates to measuring instruments, and the primary object thereof is to provide improved dividers having graduated portions so associated therewith as to indicate the distance between the measuring points of the dividers when extended to various positions.

A further object of the invention is to provide indicating dividers embodying certain novel features whereby the device may be readily folded into a compact form when not being used, and dividers of the described character which are simple in construction, and efficient in operation.

Other objects and advantages of the invention will be apparent during the course of the following detailed description, taken in connection with the accompanying drawing, forming a part of this specification, and in which drawing, Figure 1 is a front elevation of my improved measuring instrument, showing the same in an opened operative position, and showing the legs in a partially opened position.

Figure 2 is a view similar to Figure 1 and showing the legs in a fully closed position.

Figure 3 is a front elevation of the device in a fully collapsed or folded position.

Figure 4 is an edge elevation of the device as shown in Figure 2.

Figure 5 is an enlarged fragmentary section on the line 5—5 of Figure 2 and looking in the direction of the arrows, and Figure 6 is an enlarged fragmentary detail section, showing the manner of mounting the arcuate scale upon one leg section of the device.

Referring to the drawing in detail, and wherein like numerals designate corresponding parts throughout the several views, 10 and 11 indicate legs of the dividers, which are pivotally connected intermediate their ends by a suitable rivet 12. Formed at the upper or short portion of the leg 10, is a head portion 13 having its major axis lying out of the plane of the major axis of the leg 10. A transversely extending slot 14 is provided in the upper end of the head 13 for pivotal mounting of an arcuate scale arm 15, as by a rivet 16. Formed at the upper or short portion of the companion leg 11, is an indicator arm 17, the pointed free end 18 of which is adapted to move in an arcuate path over the arcuate scale arm 15 for indicating the extent of opening, or the distance between the measuring points 19 of the dividers.

The arcuate scale arm 15 is formed at its pivotal end with a major end face 20 and a minor end face 21 in angular relation thereto. These end faces 20 and 21 are adapted for co-acting relation with a flat leaf spring 22, which is secured at one end to the outer face 23 of the head 13 as by rivets or screws 24. This spring 22, which lies in surface contact with the outer face 23 of the head portion 13 has its free end portion in overlying relation with the outer end of the slot 14, in a manner for yieldably engaging the end faces of the scale arm for holding the arm in either an extended or collapsed position.

A suitable scale 25 is provided on the face of the arcuate arm 15, and with which the indicator arm 17 coacts, for indicating the distance between the measuring points 19.

When the arcuate scale arm 15 is swung to an open or extended operative position, the spring 22 will act upon the major end face 20 and retain the scale arm in concentric relation with the pivot 12, and when swung inwardly, the spring will act upon the minor face 21 for retaining the scale arm in a collapsed or folded position, as shown in Figures 1 and 3 respectively. When the arcuate scale arm is swung to a collapsed position, its free end portion is adapted to lie in overlapping relation with the legs 10 and 11 for forming a compact device when not in use.

It will be seen that when the legs 10 and 11 are moved to a closed overlapping position, that the offsetting of the head 13, will permit of the indicator arm 17 being moved to a compact position adjacent the head 13.

While the device has been illustrated and described as a pair of dividers, it is to be understood that the principle may be equally well embodied in calipers for various uses, or in connection with compasses for describing circles.

Changes in detail may be made without departing from the spirit or scope of my invention; but,

I claim:

1. A measuring instrument comprising a pair of legs pivotally connected intermediate their ends, an arcuate scale arm pivotally connected at one end to the upper end of one of said legs in concentric relation to the pivot thereof, said scale arm being provided at its pivotal end with a major end face and a minor end face in angular relation to one another, yieldable means acting upon said major and minor end faces for retaining the scale arm in an operative concentric position or in collapsed overlying relation respectively with said legs, and an indicator arm formed at the upper end of the companion leg adapted to move in an arcuate path over the scale arm when in an operative position, for indicating the distance between the measuring points of the legs.

2. A measuring instrument comprising a pair of legs pivotally connected intermediate their ends, a head portion having a transversely extending slot provided in the upper end thereof, formed at the upper end of one of said legs, an arcuate scale arm pivotally mounted in said slot and adapted to be positioned in concentric relation to the pivot of said legs, said scale arm provided at its pivotal end with a major end face and a minor end face in angular relation to one another, an indicator arm formed at the upper end of the companion leg adapted to move in an arcuate path over the arcuate scale arm for indicating the distance between the measuring points of the legs, and a flat spring secured at one end to the outer face of said head portion and having its free end portion overlying the outer end of said slot for yieldably engaging said end faces for retaining the arcuate scale arm in either an open or collapsed position with respect to said legs.

LAWRENCE YASUKICHI KIMURA.